United States Patent [19]

Parker et al.

[11] 4,229,212

[45] Oct. 21, 1980

[54] RECOVERY OF COPPER FROM MATERIALS CONTAINING COPPER AND ACID SOLUBLE IRON COMPOUNDS

[75] Inventors: Alan J. Parker, South Perth; David M. Muir, Palmyra, both of Australia

[73] Assignee: Anumin Pty. Ltd., Canberra, Australia

[21] Appl. No.: 933,566

[22] Filed: Aug. 14, 1978

Related U.S. Application Data

[63] Continuation of Ser. No. 760,330, Jan. 18, 1977, abandoned.

[30] Foreign Application Priority Data

Jan. 19, 1976 [AU] Australia .......................... PC4557
Feb. 27, 1976 [AU] Australia .......................... PC5034

[51] Int. Cl.$^3$ ................................................ C22B 15/00
[52] U.S. Cl. ......................................... 75/101 R; 75/108; 75/117; 423/27; 423/43; 423/140
[58] Field of Search ...................... 423/27, 35, 43; 75/101 R, 108, 117

[56] References Cited

U.S. PATENT DOCUMENTS 1,263,727  4/1918  Anderson ............................ 75/117
3,865,744  2/1975  Parker et al. ......................... 423/27

OTHER PUBLICATIONS

Habashi, F., *Principles of Extractive Metallurgy*, vol. II, Gordon and Breach, NY (1970), pp. 8–10, 205–207.
Chemical Abstracts, vol. 66, (1967) #31136r.

*Primary Examiner*—Brian E. Hearn
*Attorney, Agent, or Firm*—Fleit & Jacobson

[57] ABSTRACT

The invention relates to a method of controlling acid soluble iron while obtaining solutions of copper (I) salts in water containing an organo nitrile (selected from the group consisting of acetonitrile, 2-hydroxycyanoethane, acrylonitrile and propionitrile) from materials containing copper and iron compounds, said solutions having a low iron content, which method comprises leaching the material with a solution of copper (II) salt in water containing the selected organo nitrile, the amount of nitrile present being sufficient to stabilize the resulting copper (I) solution and the pH of the mixed solution being controlled in relation to the relative concentrations of the copper (II) salt, copper (I) salt and nitrile to ensure that the iron compounds are not significantly soluble therein, and then separating the copper (I) solution from the insoluble materials.

12 Claims, 1 Drawing Figure

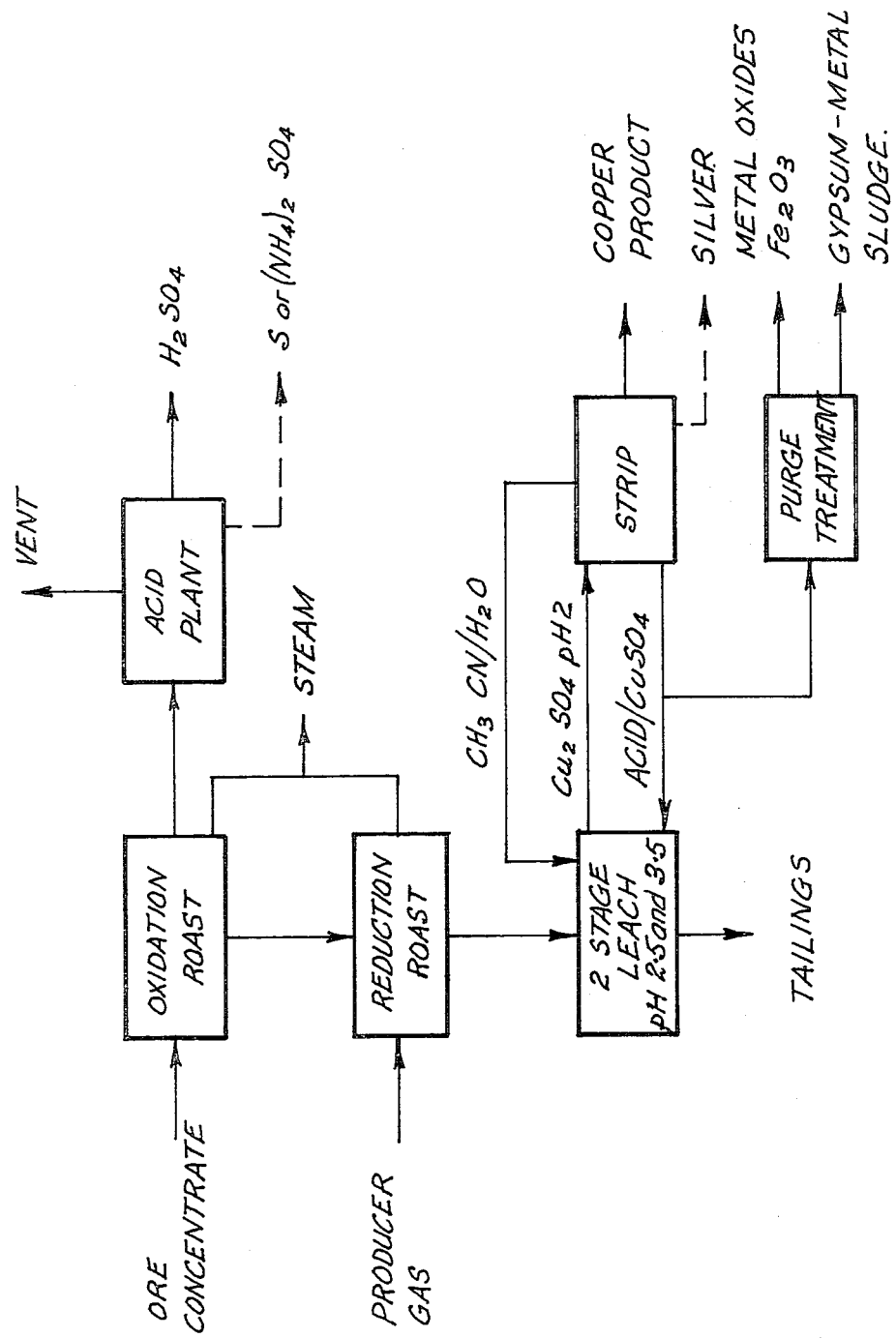

RECOVERY OF COPPER FROM MATERIALS CONTAINING COPPER AND ACID SOLUBLE IRON COMPOUNDS

This is a continuation of application Ser. No. 760,330, filed Jan. 18, 1977 now abandoned.

This invention relates to the preparation of copper(I) sulphate solutions containing acetonitrile or 2-hydroxycyanoethane and hence to recovery of copper from material containing copper and acid soluble iron compounds as well as the removal of iron from ferrous sulphate solutions.

Such solutions can be thermally or electrochemically disproportionated to give high purity metallic copper, as described by Parker et al in British Pat. No. 1,381,666 (1975) and so methods of preparing such copper(I) sulphate solutions are a desirable objective.

The need for hydrometallurgical procedures as an alternative to smelting and electrorefining of copper sulphides is now recognised. However, a difficulty in many hydrometallurgical processes for converting copper iron sulphides (e.g. $CuFeS_2$) to copper is the solubility of iron, as well as of copper. Mixtures of copper (II) and iron (II) sulphate are commonly produced in many hydrometallurgical processes. Thus it is desirable to develop leach systems where the solvent is selective for copper and in which iron salts are insoluble and or to develop methods of treating copper iron sulphides so that the iron is in an insoluble form for the particular leach system chosen. These are the objective of this invention.

Recent work by the U.S. Bureau of Mines in report 7996 describes a double roast procedure of oxidation at 600°–800° C. to remove sulphur from $FeS_2$ as sulphur dioxide, then reduction with hydrogen or producer gas at 800° C. to produce particulate copper and iron oxides, mainly as magnetite.

A related procedure has been described by Opie and Coffin, U.S. Pat. No. 3,799,764 (1974) where the copper iron sulphide is dead roasted to remove most of the sulphur (<1% remains) and the calcine is then subjected to a solid state segregation roast at 650°–800° C. with carbonaceous material and a little alkali metal chloride to produce segregated particulate copper and magnetite. These double roasts provide an attractive route to copper from copper iron sulphides. However, a significant proportion of the magnetite dissolves in dilute sulphuric acid at a pH of 2.5 or less in water, so that acid leaching is not practicable.

It has been found that the particulate copper produced by a segregation or reduction roast can be oxidatively leached selectively as copper(I) sulphate solution from acid soluble iron compounds, such as magnetite, with a solution of copper (II) sulphate in water containing sufficient acetonitrile, 2-hydroxycyanoethane, acrylonitrile or propionitrile to complex with the resulting copper(I) ions, provided that the pH is carefully controlled at a value high enough to prevent dissolution of iron but low enough to prevent precipitation or to dissolve basic copper salts. Thus in one form the invention resides in a method of obtaining solutions of copper(I) salt in water containing an organonitrile (selected from the group consisting of acetonitrile, 2-hydroxycyanoethane, acrylonitrile and propionitrile) from materials containing copper and iron compounds, said solutions having a low iron content, which method comprises leaching the material with a solution of copper(II) sulphate in water containing the selected organonitrile, the amount of nitrile present being sufficient to stabilize the resulting copper(I) solution and the pH of the mixed solution being controlled in relation to the relative concentrations of the copper(II) salt, copper(I) salt and nitrile to ensure that the iron compounds are not significantly soluble therein, and then separating the copper(I) solution from the insoluble materials.

The pH, the proportion of organic nitrile, the proportion of copper(II) salt and the concentration of copper(I) salt are interdependent variables in determining the reactions which take place. A pH above 2.5 but below 4.5 is preferred but the higher the proportion of nitrile and copper(II) ions to the eventual concentration of copper(I) ions, the lower the pH which is possible.

BRIEF DESCRIPTION OF THE DRAWING

The sole FIGURE is a schematic representation of an embodiment of the process in accordance with the invention.

The invention is best understood by reference to the following equations, which represent reactions which we have shown take place in water containing water soluble organic nitriles at various pH values as roughly indicated.

Copper dissolution:

$Cu + CuSO_4 \rightarrow Cu_2SO_4$ at pH < about 4.5

Copper dissolution:

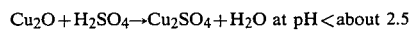
$Cu_2O + H_2SO_4 \rightarrow Cu_2SO_4 + H_2O$ at pH < about 2.5

Iron precipitation:

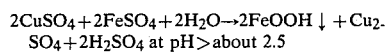
$2CuSO_4 + 2FeSO_4 + 2H_2O \rightarrow 2FeOOH\downarrow + Cu_2SO_4 + 2H_2SO_4$ at pH > about 2.5

Copper precipitation:

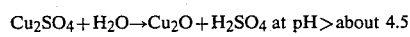
$Cu_2SO_4 + H_2O \rightarrow Cu_2O + H_2SO_4$ at pH > about 4.5

Iron dissolution:
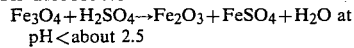
$Fe_3O_4 + H_2SO_4 \rightarrow Fe_2O_3 + FeSO_4 + H_2O$ at pH < about 2.5

Copper(I) oxidation:

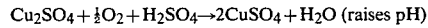
$Cu_2SO_4 + \frac{1}{2}O_2 + H_2SO_4 \rightarrow 2CuSO_4 + H_2O$ (raises pH)

Clearly in the pH region, roughly between 2 and 5, the prospect exists for preparing copper(I) sulphate solutions of low iron content, because of oxidation of iron-(II) to iron (III) with precipitation of basic iron(III) compounds. It is desirable to protect solutions from oxidation by air. The extent of iron control will depend very much on the oxidising potential of the $CuSO_4/Cu_2SO_4$ couple, and the reducing potential of the $FeSO_4/FeOOH$ couple. Thus the higher the pH (precipitation of FeOOH), the greater the proportion of $CuSO_4$ to $Cu_2SO_4$ and the greater the proportion of organic nitrile, the lower the iron content of the $Cu_2SO_4$ solution.

It should be noted that some acid is needed to leach all the copper if the particulate copper is partially oxidised, i.e. contains some $Cu_2O$ or CuO. The preferred pH of 2.5–4.5 is approximate and refers to the apparent pH, as measured by a glass-calomel electrode system in the nonaqueous solvent system. Actual acidity for optimum copper extraction and low iron is best decided by experiment following the principles outlined herein. If high concentrations of organic nitrile are present, an electrode indicating pH may not be a rigorous pH on the aqueous scale. It should also be noted that the FeOOH shown in the equations covers other slightly soluble ferric salts, such as goethite, jarosites and $Fe_2O_3$.

It will be appreciated that for situations where the concentration of $CuSO_4$ remains significant compared to that of $Cu_2SO_4$ and where the concentration of the water soluble organic nitrile is high, the oxidation potential of $CuSO_4/Cu_2SO_4$ will be high and the reaction $2FeSO_4 + 2CuSO_4 + 4H_2O \rightarrow 2FeOOH + Cu_2SO_4 + 3H_2SO_4$ will proceed at relatively low pH (2.5), e.g. if magnetite dissolves it will reprecipitate as goethite and Cu and $Cu_2O$ will dissolve. However, if high concentrations of $Cu_2SO_4$ and low concentrations of $CuSO_4$ are present, then a higher pH (3.5) is needed to dissolve Cu without dissolving magnetite and $Cu_2O$. For this reason, it is often desirable to leach most of the copper at pH 3.5 with $CuSO_4/RCN/H_2O$ to generate a concentrated $Cu_2SO_4$ solution, then to leach the residue, if it contains for example a little $Cu_2O$ and possibly some basic copper salts, with fresh $CuSO_4/RCN/H_2O$ at an initial pH of 2.5.

Adjustment of pH also allows iron to be precipitated from solutions of $CuSO_4 + FeSO_4$ in water containing organic nitriles. Thus by adding a base such as lime, sodium hydroxide or ammonia, to control the pH between 2.5 and 4.5, $CuSO_4$ is reduced to $Cu_2SO_4$ and $FeSO_4$ is oxidised and precipitated as FeOOH or a jarosite or similar.

In all cases the resulting $Cu_2SO_4$ solution can be separated from the insoluble iron compounds. This solution can be thermally or electrochemically disproportionated to give copper, depending on the organic nitrile used. It should be noted that 2-hydroxycyanoethane is only suited to electrochemical disproportionation because of its high boiling point.

$$Cu_2SO_4 \rightarrow Cu + CuSO_4$$

The methods are illustrated by the following examples:

EXAMPLE I 100 g of a segregation roasted (at 750° C.) calcine from a dead roast of a chalcopyrite concentrate was supplied by Amax Inc. It contained 39% copper and 23% iron as magnetite. The sample was leached twice for a one hour period at 50° C. with 500 ml of water containing 0.66 M copper(II) sulphate and 6 M acetonitrile under an atmosphere of carbon dioxide. The initial pH was below 2 and the iron content of the solution rose to 5 g/liter and the pH increased to 3 as measured with a calomel-glass electrode system. Addition of a little oxygen lowered the iron, but not the copper concentration. Less than 2 g liter$^{-1}$ of iron was in the final solution, which contained 76 g/liter copper(I) ions. The solution was separated from the solid residue and after pH adjustment to 2, was thermally disproportionated to give 38 g of particulate copper.

A similar solution of $Cu_2SO_4$ was obtained when 6 M 2-hydroxycyanoethane replaced the acetonitrile.

EXAMPLE 2

A 100 g sample of reduction roasted calcine from a dead roast of a chalcopyrite concentrate followed by reduction with producer gas was supplied by the U.S. Bureau of Mines. This was similar to the double roasted copper material described in USBM RI 7996 and contained 33% copper and 30% iron as magnetite. The sample was leached with 0.6 M $CuSO_4$ and 6 M acetonitrile at 55° C. in 500 ml solution at pH 3. 95–97% of the copper was leached as $Cu_2SO_4$ and the solution contained <1 g liter$^{-1}$ iron.

EXAMPLE 3

This describes a preferred procedure. A segregation roasted calcine from a dead roasted chalcopyrite concentrate, containing 42% copper and 23% iron, with 4.6% of the copper oxidised, was supplied by Amax Inc. A 100 g sample was washed with 75 ml of water to remove soluble chlorides, it was then leached at 55° C. by stirring for 30 minutes with 750 ml of 0.77 M copper(II) sulphate containing 7 M acetonitrile at pH 3.5 under an atmosphere of $CO_2$. The slurry was filtered to give a residue and a pregnant solution containing 90 g/l copper(I) ions, 0.05 M $CuSO_4$ and 0.1 g/l iron salts. The pH of the pregnant solution was adjusted to 2.8 by the addition of a few mls of concentrated sulphuric acid and the acetonitrile and some water were then removed at 55°–65° C. by injecting steam at a pressure of 200 mm Hg. Copper powder (25 g) precipitated and was filtered off. The bottoms solution was reconstituted with 250 ml of acetonitrile and water to a total volume of 750 ml. The leach residue, which still contained some copper, was leached at 55° C. with the acidic reconstituted $CuSO_4$ solution, where the pH stabilised at 2.5 over 30 minutes. The residue was filtered and contained only 0.45% copper in 58.5 gm. Thus 99.3% of the copper had been leached. The pregnant liquor from this second leach contained only 0.01 g/liter iron salts, 15 g/l $Cu_2SO_4$ and 0.3 M $CuSO_4$, and was low in iron at pH 2.5 because of the high proportion of copper(II) to copper(I) ions.

EXAMPLE 4

One liter of a solution containing 0.5 M $CuSO_4$ and 0.5 M $FeSO_4$ in water at pH 2.5 was mixed with 250 g of acetonitrile and 0.5 moles of calcium oxide at 25° C. to maintain a pH of 2.5–3. A precipitate of gypsum and iron oxide formed and the solution contained 0.2 M $Cu_2SO_4$ with <1 g/liter iron in solution. Some copper was coprecipitated with the gypsum and iron oxide. A similar result was obtained with 6 M 2-hydroxycyanoethane in place of acetonitrile.

These examples suggest that the process for obtaining copper from copper-iron-sulphides which is shown in the flow diagram of the accompanying drawing is viable. It will be appreciated that by leaching copper at a pH in excess of 2.5 in the presence of a high concentration of acetonitrile or 2-hydroxycyanoethane, several other common impurities such as bismuth, arsenic, antimony and tin, which are often present in blister copper, will be only very slightly soluble.

As indicated above the chemical reaction $2CuSO_4 + 2FeSO_4 + 4H_2O$ 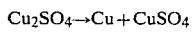 $2FeOOH + Cu_2SO_4 + 3H_2SO_4$ provides suitable mechanism for the removal of iron from a ferrous sulphate solution, a problem which is encountered in hydrometallurgical processing of copper and other metals from ores and scrap. This aspect is illustrated in the following examples, which also illustrate the application of the process using anions other than sulphate:

EXAMPLE 5

A liter of solution containing 0.8 M $CuSO_4$ and 0.8 M $FeSO_4$ in water at pH 1.5 was mixed with 250 g of acetonitrile and heated to boiling. Ammonia was then added over a period of 1 hour to bring the pH to 2.5. As the pH rose above 2, a yellow-brown solid, believed to be ammonium jarosite $NH_4Fe_3(SO_4)_2(OH)_6$ was precipitated which was readily filterable. The precipitate weighed 56 g and analysed as 28.5% Fe and 1.3% Cu. The remaining filtrate was analysed by Atomic Absorption Spectroscopy and found to contain 32 gl$^{-1}$ Copper (as Cu$^+$) and 8.3 gl$^{-1}$ iron (as Fe$^{2+}$). A similar result was obtained with a solution containing 0.5 M $CuCl_2$, 0.5 M $FeCl_2$ and 0.2 M $(NH_4)_2SO_4$ and with sodium hydroxide rather than ammonia as base. These results indicate that about 75% of the iron in solution can be precipitated as a relatively pure jarosite. More iron is precipitated as the pH is raised to 3.0 but it is contaminated with more copper.

EXAMPLE 6

A liter of solution containing 0.5 M $CuCl_2$, 0.5 M $FeCl_2$ and 6 M acetonitrile at pH 1.5 was heated to 70° C. and neutralised to pH 3 with 7 M $NH_3$ solution. A dark brown precipitate of an iron hydroxide believed to be goethite was formed around pH 2.5 which was slow to filter. An analysis of the precipitate showed that it contained 37% Fe and about 9% Cu. The remaining solution contained 25 gl$^{-1}$ Cu (as Cu$^+$) and 1.5 gl$^{-1}$ Fe (as Fe$^{2+}$).

A similar result was obtained using $Cu(NO_3)_2$ and $Fe(NO_3)_2$ rather than $CuCl_2$ and $FeCl_2$.

EXAMPLE 7

A liter of solution containing 0.3 M $CuSO_4$, 0.2 M $FeSO_4$ and 100 g of propionitrile at pH 1.5 was heated to 70° C. and neutralised to pH 3.5 by the dropwise addition of 7 M $NH_3$ solution over 1 hour. A yellow precipitate of ammoniom jarosite appeared at pH 2.5 but mostly precipitated at pH 3.3. The precipitate was readily filterable and contained 47% Fe and 9% Cu. About half of the original iron in the solution was precipitated. The reaction is limited by the solubility of propionitrile in water ($\sim$100 gl$^{-1}$). When the experiment was repeated using acrylonitrile (100 gl$^{-1}$) in place of propionitrile about 10% of the iron in solution precipitated as ammonium jarosite at pH 3.0. Some excess undissolved acrylonitrile remained as an upper layer. Further addition of base to pH 3.5 produced a mixed copper hydroxide—jarosite precipitate. Acrylonitrile is less soluble in water than propionitrile and the equilibrium reaction to produce Fe$^{3+}$ is less complete.

The claims defining the invention are as follows:

1. A method of preventing acid soluble iron from entering solution while preparing a solution of Cu(I) salts from a material containing both copper and acid soluble iron comprising the steps of:
   (a) leaching said material with an acidic aqueous solution containing a Cu(II) salt and an organonitrile selected from the group consisting of acetonitrile, 2-hydroxycyanoethane, acrylonitrile and propionitrile, the amount of nitrile being sufficient to stabilize the resulting Cu(I) solution; and
   (b) controlling the ratio of Cu(II) to Cu(I), while maintaining the pH of the solution between about 2 and 5, to ensure that acid soluble iron does not dissolve as Fe(II).

2. The method of claim 1, wherein the pH is maintained between about 2.5 and 4.5.

3. The method of claim 1, wherein the leaching is carried out to prevent oxidation of the solution by air.

4. The method of claim 1, wherein the pH is controlled by the addition of a base, a metal or a metal oxide.

5. The method of claim 1, wherein the leaching step is carried out in two stages, the first stage being conducted at a pH of about 3.5 to produce a concentrated Cu (I) salt solution, and the second stage being conducted at an initial pH of about 2.5 with a fresh leach solution having a higher Cu (II) to Cu (I) ratio than the first stage leach.

6. The method of claim 1, wherein the copper salt is copper sulphate.

7. The method of claim 1, wherein the leached material contains magnetite.

8. The method of claim 1, wherein the leached material is prepared from a copper-iron sulphide concentrate by dead-roasting said concentrate to reduce the sulphur content to not more than about 1% by weight followed by reduction roasting said roasted concentrate to produce copper metal and iron oxides.

9. The method of claim 8, wherein the reduction roast is a solid-state segregation roast employing a carbonaceous material and alkali metal chlorides.

10. The method of claim 1, further comprising the steps of separating the Cu (I) solution from the insoluble materials and disproportionating the Cu (I) salt solution to produce particulate copper.

11. A method of preventing acid soluble iron from entering solution while preparing a solution of Cu(I) salts from a magnetite, particulate copper mixture comprising the steps of:
    (a) leaching said mixture with an acidic aqueous solution containing a Cu(II) salt and an organonitrile selected from the group consisting of acetonitrile, 2-hydroxycyanoethane, acrylonitrile and propionitrile, the amount of nitrile being sufficient to stabilize the resulting Cu(I) solution; and
    (b) controlling the ratio of Cu(II) to Cu(I), while maintaining the pH of the solution between about 2 and 5 to ensure that acid soluble iron does not dissolve as Fe(II).

12. A method of preventing acid soluble iron from entering solution while preparing a solution of Cu(I) salts from a material containing both copper and acid soluble iron comprising the steps of:
    (a) leaching said material with an acidic, aqueous copper sulphate solution and an organonitrile selected from the group consisting of acetonitrile, 2-hydroxycyanoethane, acrylonitrile and propionitrile, the amount of nitrile being sufficient to stabilize the resulting Cu(I) solution; and
    (b) controlling the ratio of Cu(II) to Cu(I) while maintaining the pH of the solution between about 2.5 and 4.5 to ensure that acid soluble iron does not dissolve as Fe(II).

* * * * *